(12) United States Patent
Unno et al.

(10) Patent No.: US 10,593,133 B2
(45) Date of Patent: Mar. 17, 2020

(54) DETERMINING A CURRENT POSITION OF A VEHICLE IN REAL-TIME

(71) Applicant: International Business Machines Corporation, Armonk, NY (US)

(72) Inventors: Asuka Unno, Koutou-ku (JP); Satoshi Hosokawa, Kodaira (JP); Shoichiro Watanabe, Nerima-ku (JP); Yasutaka Nishimura, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 15/835,323

(22) Filed: Dec. 7, 2017

(65) Prior Publication Data

US 2019/0180523 A1    Jun. 13, 2019

(51) Int. Cl.
  *G07C 5/00* (2006.01)
  *G01C 21/16* (2006.01)
  (Continued)

(52) U.S. Cl.
  CPC ............. *G07C 5/008* (2013.01); *B60W 30/02* (2013.01); *G01C 21/165* (2013.01); *G01S 19/14* (2013.01);
  (Continued)

(58) Field of Classification Search
  CPC ..... G07C 5/008; B60W 30/02; G01C 21/165; G01S 19/45; G01S 19/49; G06F 17/18
  USPC ........................................................ 701/472
  See application file for complete search history.

(56) References Cited

U.S. PATENT DOCUMENTS

| 9,103,671 B1* | 8/2015 | Breed ................. G01C 11/025 |
| 2007/0290839 A1* | 12/2007 | Uyeki ................ G01C 21/3415 340/539.13 |

(Continued)

FOREIGN PATENT DOCUMENTS

JP    2016053584 A    4/2016

OTHER PUBLICATIONS

Masatoshi Kumagai et al., "Realtime Interpolation Method for Probe Car System Based on Feature Space Projection", Information Processing Society of Japan (IPSJ) Journal, vol. 47 No. 7, http://ci.nii.ac.jp/naid/110004751167, Jul. 2006.

*Primary Examiner* — Thomas G Black
*Assistant Examiner* — Wae L Louie
(74) *Attorney, Agent, or Firm* — North Shore Patents, P.C; Joseph L. Acayan

(57) ABSTRACT

Embodiments generally relate to locating a moving vehicle. In some embodiments, a method includes determining driving information associated with a vehicle that is moving, where the driving information includes pattern information associated with past movement of the vehicle. The method further includes periodically receiving reported vehicle probe information from the vehicle, where the reported vehicle probe information includes a current location of the vehicle. The method further includes acquiring context information on surroundings of the vehicle if no reported vehicle probe information is received from the vehicle for a predetermined amount of time. The method further includes generating estimation vehicle probe information associated with the vehicle based on the context information, where the estimation vehicle probe information includes one or more candidate locations of the vehicle.

20 Claims, 8 Drawing Sheets

(51) Int. Cl.
 *B60W 30/02* (2012.01)
 *G01S 19/45* (2010.01)
 *G01S 19/49* (2010.01)
 *G01S 19/48* (2010.01)
 *G01S 19/14* (2010.01)
 *G06F 17/18* (2006.01)

(52) U.S. Cl.
 CPC .............. *G01S 19/45* (2013.01); *G01S 19/48* (2013.01); *G01S 19/49* (2013.01); *G06F 17/18* (2013.01)

(56) References Cited

U.S. PATENT DOCUMENTS

| | | | |
|---|---|---|---|
| 2008/0161986 A1* | 7/2008 | Breed | G08G 1/163 701/23 |
| 2008/0215231 A1* | 9/2008 | Breed | G08G 1/161 701/117 |
| 2012/0190380 A1* | 7/2012 | Dupray | G01S 1/026 455/456.1 |
| 2014/0046595 A1* | 2/2014 | Segawa | G01C 21/34 701/541 |
| 2016/0097862 A1* | 4/2016 | Yim | G01C 21/165 701/472 |
| 2016/0209845 A1* | 7/2016 | Kojo | G01C 21/3407 |
| 2016/0265930 A1* | 9/2016 | Thakur | G05D 1/0088 |
| 2016/0272196 A1* | 9/2016 | Hocking | B60W 30/02 |
| 2017/0115403 A1* | 4/2017 | Moura | G01S 19/40 |
| 2017/0332208 A1* | 11/2017 | Cardoso de Moura | H04W 4/06 |
| 2018/0137675 A1* | 5/2018 | Kwant | G06T 17/05 |
| 2019/0180523 A1* | 6/2019 | Unno | G01S 19/14 |

* cited by examiner

400

DETERMINING A CURRENT POSITION OF A VEHICLE IN REAL-TIME

BACKGROUND

Cars that are equipped with Internet access or connected to a wireless local area network are becoming widely available. Such cars equipped with Internet access or connected cars may enable Internet access with various devices both inside as well as outside the cars. It has become common that sensor data transmitted from a car to a server is analyzed and applied to various solutions. For example, the current position of a car may be deduced from sensor data received from the car.

SUMMARY

Disclosed herein is a method for locating a moving vehicle, and a system and computer program product as specified in the independent claims. Embodiments are given in the dependent claims. Embodiments can be freely combined with each other if they are not mutually exclusive.

Embodiments estimate the location of a moving vehicle based on context information. In an embodiment, a method includes determining, at a server, driving information associated with a vehicle that is moving, where the driving information includes pattern information associated with past movement of the vehicle. The method further includes periodically receiving reported vehicle probe information from the vehicle, where the reported vehicle probe information includes a current location of the vehicle. The method further includes acquiring context information on surroundings of the vehicle if no reported vehicle probe information is received from the vehicle for a predetermined amount of time. The method further includes generating estimation vehicle probe information associated with the vehicle based on the context information, where the estimation vehicle probe information includes one or more candidate locations of the vehicle.

In one aspect, the estimation vehicle probe information is based at least in part on the driving information. In another aspect, the estimation vehicle probe information is based at least in part on one or more candidate routes. In another aspect, the estimation vehicle probe information includes a probability associated with each of the one or more candidate locations. In another aspect, the method further includes determining at least one traffic event based on either the reported vehicle probe information or the estimation vehicle probe information, and sending the least one traffic event to the vehicle. In another aspect, the method further includes determining at least one traffic event based on either the reported vehicle probe information or the estimation vehicle probe information, and updating the estimation vehicle probe information. In another aspect, the method further includes discarding the estimation vehicle probe information when new reported vehicle probe information is received from the moving vehicle.

DETAILED DESCRIPTION

Embodiments described herein estimate the location of a moving vehicle by deducing the current position or predicted positions of the vehicle based on context information. A system determines estimated locations of the vehicle when actual location sensor data is not available. In an embodiment, a system determines driving information associated with a vehicle that is moving, where the driving information includes pattern information associated with past movement of the vehicle (e.g., past route information associated with the vehicle, an average speed of the vehicle, etc.). The system periodically receives reported vehicle probe information from the vehicle, where the reported vehicle probe information includes a current location of the vehicle. The system acquires context information on the surroundings of the vehicle if no reported vehicle probe information is received from the vehicle for a predetermined amount of time. Such information on the surroundings may include, for example, one or more of a current traffic speed, traffic congestion information, and traffic light information, etc. The system then generates estimation vehicle probe information associated with the vehicle based on the context information, where the estimation vehicle probe information includes one or more candidate locations of the vehicle.

Figure 1:
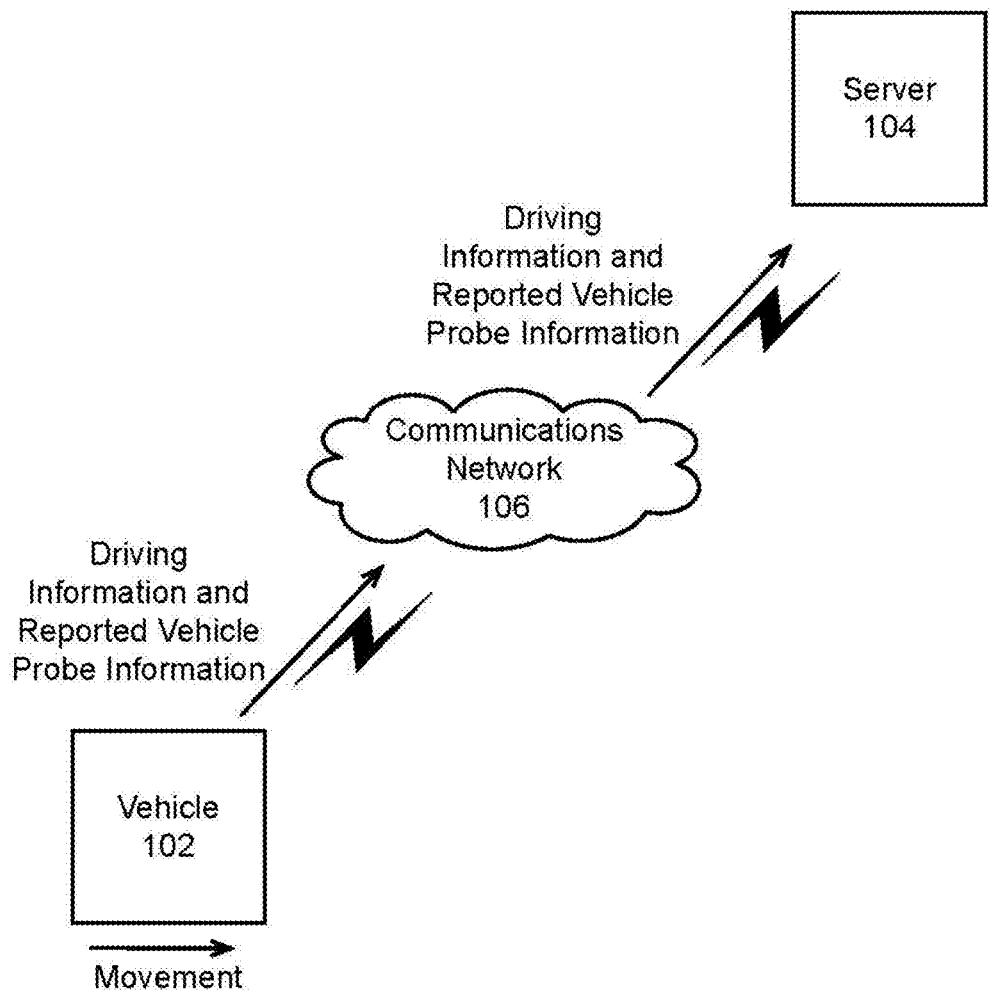
FIG. 1 is an example environment for determining the location of a vehicle, according to some embodiments.

FIG. 1 is an example environment 100 for determining the location of a vehicle, according to some embodiments. Shown is a vehicle 102, which is moving as indicated by the arrow labeled ("Movement"). Also shown is a sever 104 that communicates with the vehicle 102 via a communications network 106. The communications network 106 may be any suitable network such as the Internet, a wide area network (WAN), a cellular network, etc. In various embodiments, environment 100 may be, for example, in any area where the vehicle 102 moving (e.g., city, highway, etc.).

As described in more detail herein, the server 104 receives driving information and reported vehicle probe information from the vehicle 102. In some embodiments, the reported vehicle probe information may be received from a vehicle-mounted device.

The driving information may include past route information associated with the vehicle and an average speed of the vehicle, etc., and the reported vehicle probe information may include the current location, etc. In various embodiments, the vehicle 102 sends the reported vehicle probe information to the server 104 periodically and in real-time as the location of the vehicle 102 changes.

While the server 104 performs embodiments described herein, in other embodiments, any suitable component or combination of components associated with the server 102 or any suitable processor or processors associated with the server 104 may facilitate performing the embodiments described herein. In various embodiments, the environment 100 may not have all of the components shown and/or may have other elements including other types of components instead of, or in addition to, those shown herein.

Figure 2:
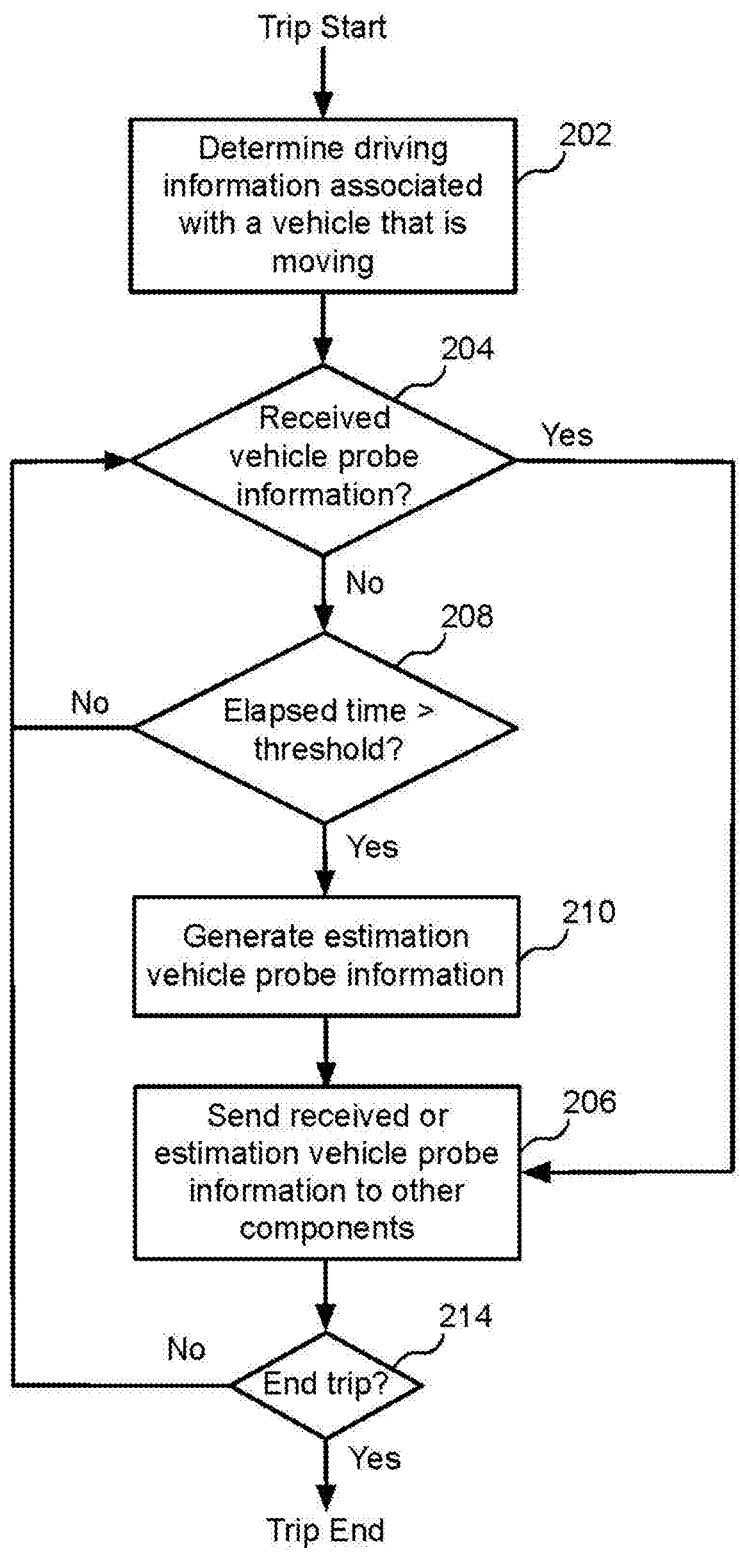
FIG. 2 is an example flow diagram for determining the location of a vehicle, according to some embodiments.

FIG. 2 is an example flow diagram for determining the location of a vehicle, according to some embodiments. As described in more detail herein, the server determines the location of a vehicle in real-time as the vehicle reports its location to the server in the reported vehicle probe information. Referring to both FIGS. 1 and 2, a method begins at block 202, where a system such as server 104 determines driving information associated with the vehicle 102 that is moving. As indicated herein, in some embodiments, the driving information may include pattern information associated with past movement of the vehicle. In some embodiments, the driving information may include information on a driving pattern unique to a driver. For example, the driving information may include past route information associated with the vehicle, an average speed of the vehicle, etc. The driving information may also include device configuration information, driver behavior statistics, etc.

The server 104 periodically receives reported vehicle probe information from the vehicle 102. In some embodiments, the reported vehicle probe information may include a current location of the vehicle. The current location of the vehicle may be based on any suitable location data such as global positioning system (GPS) data. The reported vehicle probe information from the vehicle 102 is received periodically at short intervals (e.g., once a second, etc.). The reported vehicle probe information may include any one or more of the following information: a trip number, a time stamp, geographic coordinates (e.g., longitude, latitude, heading, speed, distance traveled, link identification, road type, etc.

In various embodiments, the sensor data is transmitted from a vehicle-mounted device of the vehicle 102 selectively to reduce the amount of data communication. In various embodiments, the selectivity of the transmissions may be based on conditions (e.g., transferred when acceleration exceeds a threshold, etc.), or policies. For example, a vehicle-mounted device may be configured to report actual location sensor data when the vehicle speed increases more than a predetermined speed (e.g., 10 m/h) or decreases less than a predetermined speed (e.g., 15 m/h) compared to one second ago or other time period. In another example, a vehicle-mounted device may be configured to report actual location sensor data when the direction of the vehicle changes more than 45 degrees per second. The particular policies may vary, and will depend on the particular implementation.

At block 204, the server 104 determines if it has received reported vehicle probe information from the vehicle 102.

At block 206, if the server 104 receives the reported vehicle probe information, the server 104 sends the received vehicle probe information to other components. Such other components may include devices or software modules that direct the drive, for example. In another example, a component may be a traffic event selection component that selects traffic events, which may affect the route of the vehicle based on an estimated location.

In some scenarios, sensor data is not always transferred in a timely manner. For example, the transmitting device may be out of range (e.g., in a coverage hole), etc. The time that the sensor data is not transmitted may vary depending on the situation.

At block 208, if the server 104 does not receive reported vehicle probe information, the server 104 determines if a predetermined amount of time has passed since the server 104 last received reported vehicle probe information. The predetermined amount of time may be referred to as a time threshold. The time threshold may vary, depending on the particular implementation. For example, the time threshold may be 2 seconds, 10 seconds, 15 seconds, 30 seconds, etc. The particular time threshold may vary, and will depend on the particular implementation. For example, the time threshold may be selected based on system resources, where a small value increases the amount of calculations, but may also increase the accuracy. If the amount of elapsed time is less than the time threshold, the server 104 continues to receive vehicle probe information, while monitoring how much time has passed since server 104 most recently received vehicle probe information. In various embodiments, the server 104 deduces the current position of the vehicle where there is a reduced amount of communication between the server 104 and the vehicle 102.

At block 210, if the server 104 does not receive reported vehicle probe information from the vehicle 102 for a predetermined amount of time (e.g., the amount of elapsed time meets or exceeds the time threshold), the server 104 generates estimation vehicle probe information associated with the vehicle based on the context information. The server 104 may also generate the estimation vehicle probe information based the driving information. In various embodiments, the estimation vehicle probe information includes one or more candidate locations of the vehicle.

In various embodiments, to generate estimation vehicle probe information, the server 104 acquires context information on the surroundings of the vehicle 102. In various embodiments, the context information may include one or more of a current traffic speed, traffic congestion information, traffic light information such as traffic light patterns, etc. In some embodiments, the current traffic speed is an average speed of cars at a location at a given time. For example, the traffic speed may be the flowing speed of vehicles that are moving on the road at the given time. If there is congestion, the current traffic speed goes down. The server 104 may calculate the current traffic speed by using actual sensor data that is sent from other vehicles. Or, the server 104 may obtain current speed information from an external traffic data service that has roadside cameras to calculate current traffic speed by image recognition.

In some embodiments, the estimation vehicle probe information is based at least in part on the driving information.

In some embodiments, the estimation vehicle probe information is based at least in part on one or more candidate routes.

In some embodiments, the estimation vehicle probe information includes a probability associated with each of the one or more candidate locations.

In some embodiments, the server 104 associates a probability value with each candidate location.

At block 206, if the server 104 generates estimated vehicle probe information, the server 104 sends the received vehicle probe information to other components. As mentioned above, such other components may include devices or software modules that direct the drive, for example. Example embodiments of vehicle probe information are described in more detail herein.

At block 214, if the trip does not end, the server 104 continues to receive vehicle probe information. In some embodiments, the server 104 may determine that the trip ended if the vehicle 102 remains stopped for a predetermined amount of time (e.g., greater than 5 minutes, etc.).

In some embodiments, the server 104 determines at least one traffic event based on either the reported vehicle probe information or the estimation vehicle probe information, and sends the least one traffic event to the vehicle. In some embodiments, after the server 104 determines at least one traffic event based on either the reported vehicle probe information or the estimation vehicle probe information, the server 104 updates the estimation vehicle probe information.

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 3:
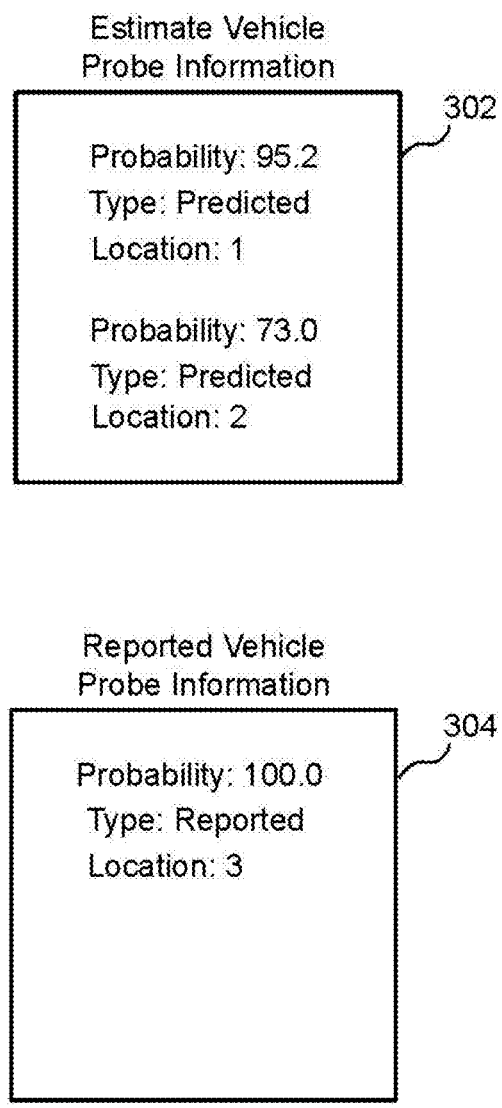
FIG. 3 is a diagram showing example vehicle probe information, according to some embodiments.

FIG. 3 is a diagram showing example vehicle probe information, according to some embodiments. Shown is estimated vehicle probe information 302, and reported vehicle probe information 304. As shown, vehicle probe information 302 includes two entries. The first entry shows a probability of 95.2% that the vehicle 102 is in Location 1. Also shown is an indicator that the vehicle probe information is predicted. The second entry shows a probability of 73.0 that the vehicle 102 is in Location 2. Also shown is an indicator that the vehicle probe information is predicted. In some embodiments, the server 104 discards one or more candidate locations from the estimation vehicle probe information based on their low probabilities of being correct.

Reported vehicle probe information 304 includes one entry. The entry shows a probability of 100.0% that the vehicle 102 is in Location 3. Because this vehicle probe information is reported by the vehicle 102, this vehicle probe information is based on an actual sensor reading (e.g., GPS data) and is thus the actual location of the vehicle 102. In some embodiments, the server 104 discards the estimation vehicle probe information when new reported vehicle probe information is received from the moving vehicle.

The following is an example scenario that illustrates various embodiments described herein. In some embodiments, when the server 104 generates estimation vehicle probe information, the server 104 first finds possible route paths that the vehicle 102 can take, based on the road network topology or historical route patterns that the driver had taken in the past. The following examples illustrate two possible routes. The server 104 generates the estimated or candidate location sensor data for the predetermine amount of time (e.g., 120 seconds) for the 2 possible routes. In some embodiments, the candidate sensor data is generated taking driving characteristic/statistics of the driver into account. In some embodiments, the server 104 then evaluates the validity of each candidate sensor data using any conditions that the vehicle 102 reports in the vehicle probe information.

Figure 4:
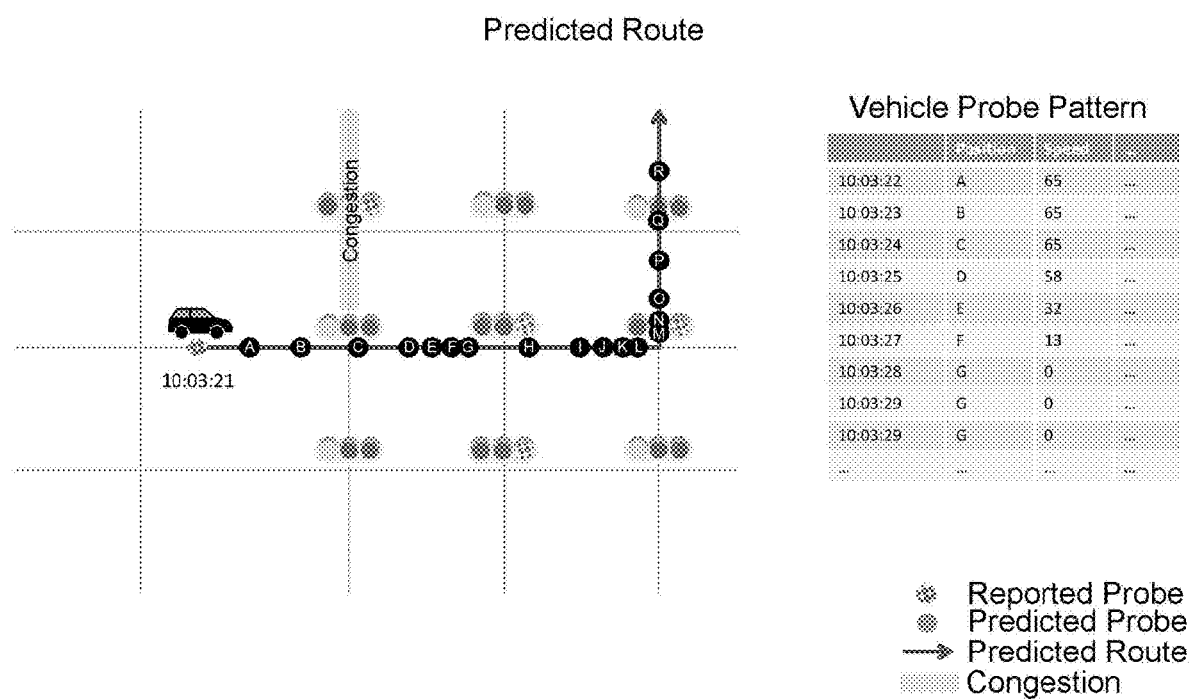
FIG. 4 is a diagram showing an example route and associated context information, according to some embodiments.

FIG. 4 is a diagram showing an example predicted route 400 and associated context information, according to some embodiments. The predicted route 400 shows that the last reported vehicle probe information was sent at 10:03:21. If the server 104 generates estimated vehicle probe information, the server 104 determines predicted route entries for various points along the route 400. If there is a traffic light, which was red at that time that the vehicle 102 would arrive at that intersection, the vehicle 102 should have decreased the speed to stop at the traffic light. The server 104 would predict that the vehicle would be stopped at the red light for a particular amount of time. The server generates these predicted data points and stores the data points as entries. As indicated herein, each entry may include a time stamp, a position (candidate or predicted location), a predicted speed, and a probability.

Figure 5:
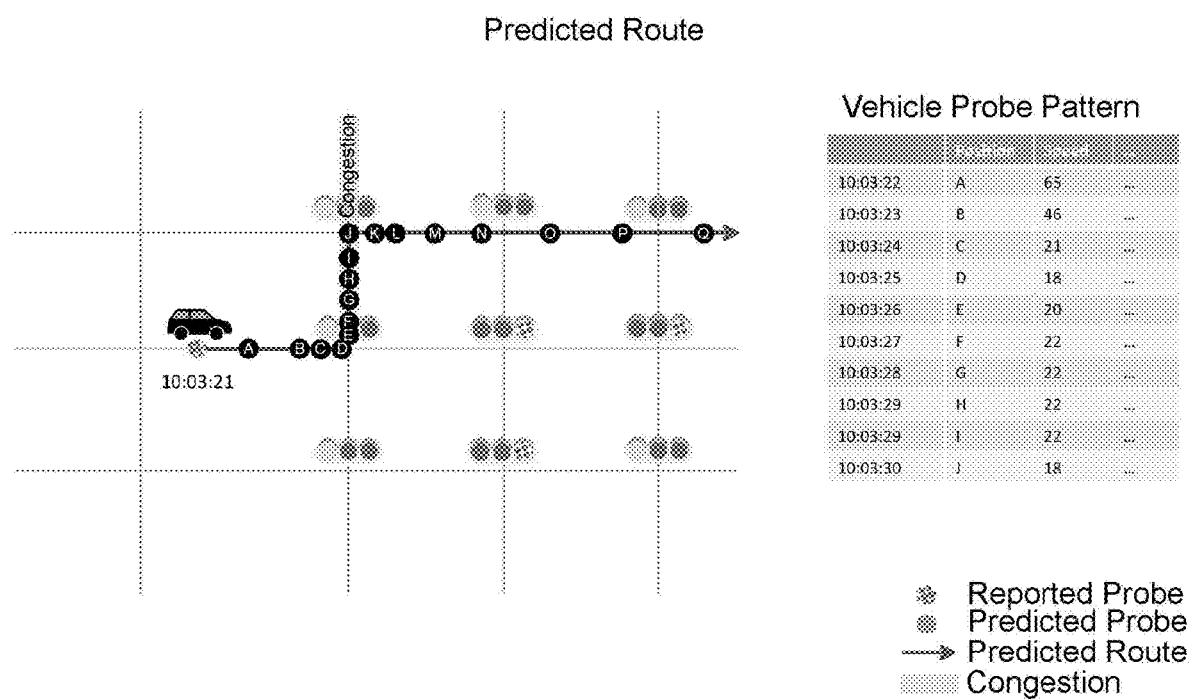
FIG. 5 is a diagram showing another example route and associated context information, according to some embodiments.

FIG. 5 is a diagram showing an example predicted route 500 and associated context information, according to some embodiments. The predicted route 500 shows that the last reported vehicle probe information was sent at 10:03:21. If the server 104 generates estimated vehicle probe information, the server 104 determines predicted route entries for various points along the route 500, in addition to the predicted route entries of route 400. If there is traffic congestion along the route which the vehicle 102 would be in at the time, the vehicle 102 should have decreased the speed to the average speed of traffic while in the traffic congestion. The server 104 would predict that the vehicle would be slowed down while in the traffic congestion. The server generates these predicted data points and stores the data points as entries. As indicated herein, each entry may include a time stamp, a position (candidate or predicted location), a predicted speed, and a probability.

Figure 6:
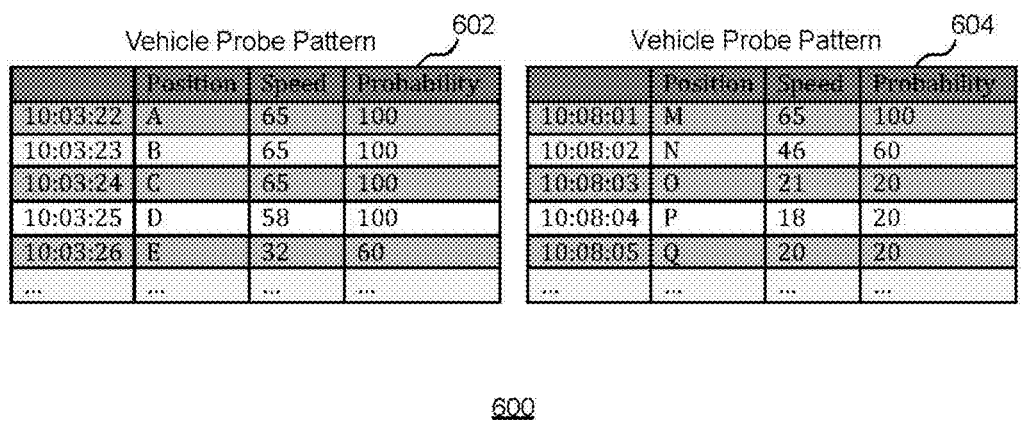
FIG. 6 is a diagram showing example vehicle probe information associated with different routes, according to some embodiments.

FIG. 6 is a diagram showing example vehicle probe information associated with different routes, according to some embodiments. Shown is a vehicle probe pattern 602 and a vehicle probe pattern 604, both of which are generated by the server 104. As shown, vehicle probe pattern 602 includes a series of positions A, B, C, D, and E. The positions A, B, C, D, and E correspond to respective time stamps 10:03:22, 10:03:23, 10:03:24, 10:03:25, and 10:03:26. The positions A, B, C, D, and E also correspond to respective speeds 65 mph, 65 mph, 65 mph, 58 mph, and 42 mph. The positions A, B, C, D, and E also correspond to respective probabilities 100%, 100%, 100%, 100%, and 60%, that the vehicle 102 is at those locations. The locations where the probabilities are 100% are based on reported vehicle probe information, and the location where the probability is less than 100% is based on estimated vehicle probe information. As shown, the connected-vehicle system received vehicle probe information until 10:03:26.

Vehicle probe pattern 604 includes a series of positions M, N, O, P, and Q. The positions M, N, O, P, and Q correspond to respective time stamps 10:08:01, 10:08:02, 10:08:03, 10:08:04, and 10:08:05. The positions M, N, O, P, and Q also correspond to respective speeds 65 mph, 46 mph, 21 mph, 18 mph, and 20 mph. The positions M, N, O, P, and Q also correspond to respective probabilities 100%, 60%, 20%, 20%, and 20%, that the vehicle 102 is at those locations. The locations where the probabilities are 100% are based on reported vehicle probe information, and the locations where the probabilities are less than100% are based on estimated vehicle probe information. As shown, the connected-vehicle system received vehicle probe information at 10:08:01 but not at10:08:02 and after.

Figure 7:
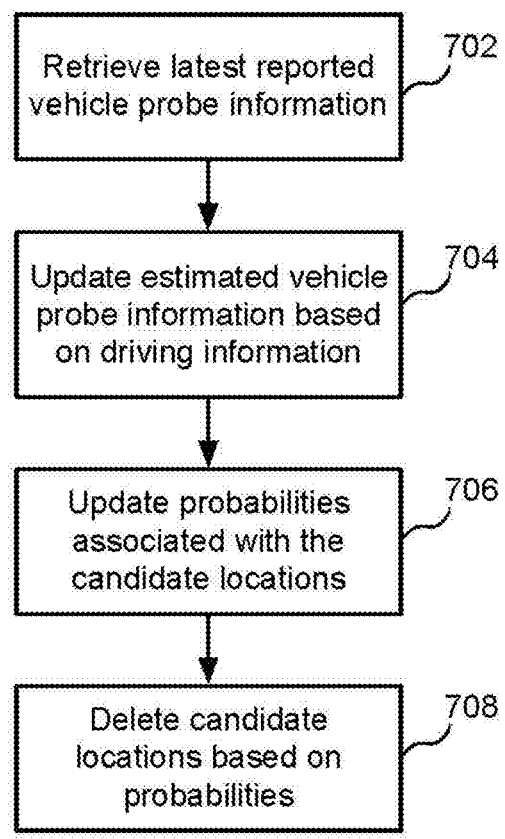
FIG. 7 is an example flow diagram for estimating the location of a vehicle, according to some embodiments.

FIG. 7 is an example flow diagram for estimating the location of a vehicle, according to some embodiments. Referring to both FIGS. 1 and 2, a method begins at block 702, where a system such as server 104 retrieves the latest reported vehicle probe information.

In various embodiments, the reported vehicle probe information may include events such as traffic accidents, traffic congestion, etc. Such events may affect the probabilities that the vehicle is in a particular location. The server 104 may select an event for a notification, and send the notification to the vehicle 102. As such, the vehicle 102 and the driver may be made aware of the event, which may affect future decisions (e.g., to circumvent traffic congestion, etc.). Such event information may affect probabilities associated with some locations. For example, traffic congestion would affect the speed of the vehicle, which would change the probabilities of the vehicle 102 being in different locations along the path with the traffic congestion. An event such as a road closure would lower the probability to zero that the vehicle 102 is on the particular route with the road closure.

At block 704, the server 104 updates the estimated vehicle probe information based on the driving information.

At block 706, the server 104 updates probabilities associated with the candidate locations.

At block 708, the server 104 deletes candidate locations based on their low probabilities of being the actual location of the vehicle 102. For example, the server 104 may delete from the list of candidate locations a candidate location for which the probability has decreased to a certain probability threshold or lower (e.g., 50%, etc.).

Although the steps, operations, or computations may be presented in a specific order, the order may be changed in particular embodiments. Other orderings of the steps are possible, depending on the particular embodiment. In some particular embodiments, multiple steps shown as sequential in this specification may be performed at the same time. Also, some embodiments may not have all of the steps shown and/or may have other steps instead of, or in addition to, those shown herein.

Figure 8:
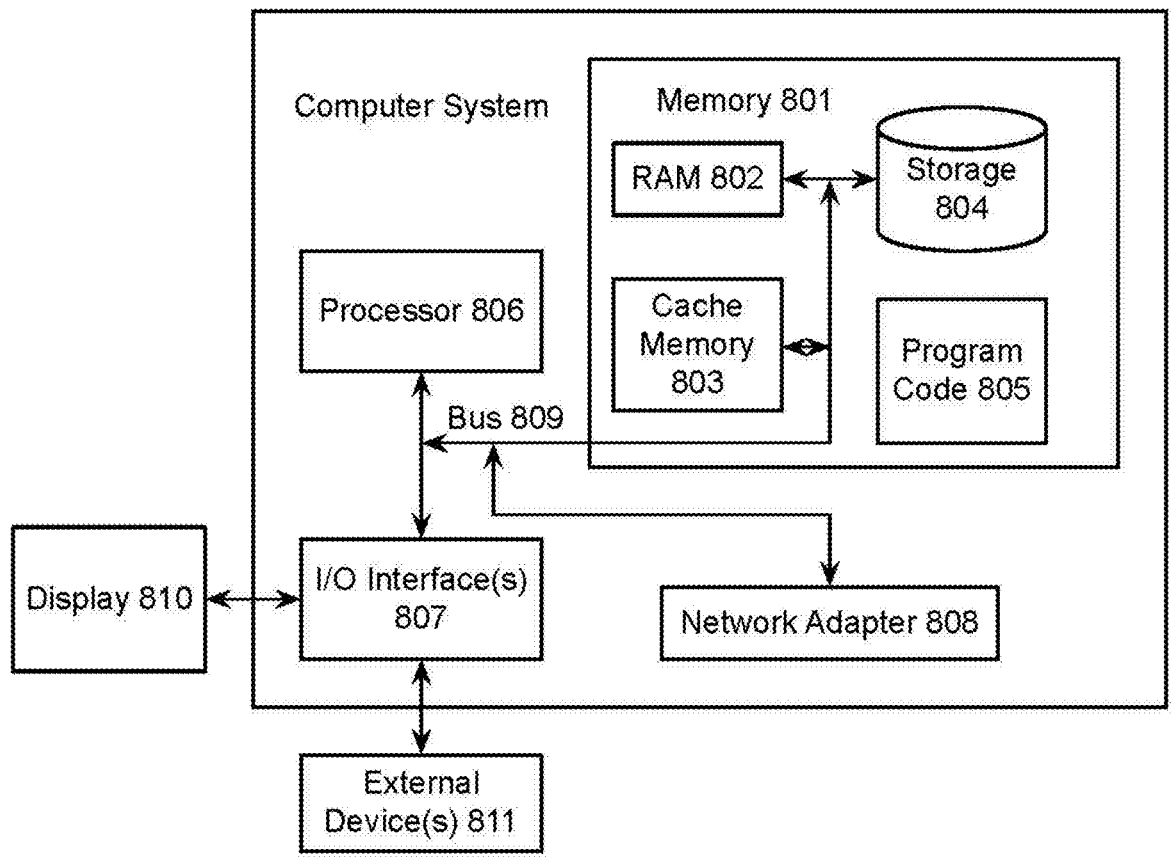
FIG. 8 is a block diagram of an example computer system, which may be used for embodiments described herein.

FIG. 8 is a block diagram of an example computer system 800, which may be used for embodiments described herein. In various embodiments, the server 104 may include a computer system such as computer system 800 according to embodiments of the present invention, as illustrated in FIG. 8. The computer system 800 is operationally coupled to one or more processing units such as processor 806, a memory 801, and a bus 809 that couples various system components, including the memory 801 to the processor 806. The bus 809 represents one or more of any of several types of bus structure, including a memory bus or memory controller, a peripheral bus, an accelerated graphics port, and a processor or local bus using any of a variety of bus architectures. The memory 801 may include computer readable media in the form of volatile memory, such as random access memory (RAM) 802 or cache memory 803, or storage 804, which may include non-volatile storage media or other types of memory. The memory 801 may include at least one program product having a set of at least one program code module such as program code 805 that are configured to carry out the functions of embodiment of the present invention when executed by the processor 806. The computer system 800 may also communicate with a display 810 or one or more other external devices 811 via input/output (I/O) interfaces 807. The computer system 800 may communicate with one or more networks, such as communications network 110, via network adapter 808.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for locating a moving vehicle, the method comprising:
    determining, at a server, driving information associated with a vehicle that is moving, wherein the driving information includes pattern information associated with past movement of the vehicle;
    periodically receiving reported vehicle probe information from the vehicle, wherein the reported vehicle probe information includes a current location of the vehicle;
    acquiring context information on surroundings of the vehicle if no reported vehicle probe information is received from the vehicle for a predetermined amount of time, wherein the context information comprises one or more of a current traffic speed, traffic congestion information, and traffic light information; and
    generating estimation vehicle probe information associated with the vehicle based on the context information, wherein the estimation vehicle probe information includes one or more candidate locations of the vehicle.

2. The method of claim 1, wherein the estimation vehicle probe information is based at least in part on the driving information.

3. The method of claim 1, wherein the estimation vehicle probe information is based at least in part on one or more candidate routes, and wherein the one or more candidate routes are based at least on the road network topology and possible route paths that the vehicle can take and based.

4. The method of claim 1, wherein the estimation vehicle probe information includes a probability associated with each of the one or more candidate locations.

5. The method of claim 1, further comprising:
    determining at least one traffic event based on either the reported vehicle probe information or the estimation vehicle probe information; and
    sending the least one traffic event to the vehicle.

6. The method of claim 1, further comprising:
    determining at least one traffic event based on either the reported vehicle probe information or the estimation vehicle probe information; and
    updating the estimation vehicle probe information.

7. The method of claim 1, further comprising discarding the estimation vehicle probe information when new reported vehicle probe information is received from the moving vehicle.

8. A computer program product for locating a moving vehicle, the computer program product including at least one computer readable storage medium having program instructions embodied therewith, the program instructions executable by at least one processor to cause the at least one processor to perform operations comprising:
    determining, at a server, driving information associated with a vehicle that is moving, wherein the driving information includes pattern information associated with past movement of the vehicle;
    periodically receiving reported vehicle probe information from the vehicle, wherein the reported vehicle probe information includes a current location of the vehicle;
    acquiring context information on surroundings of the vehicle if no reported vehicle probe information is received from the vehicle for a predetermined amount of time, wherein the context information comprises one or more of a current traffic speed, traffic congestion information, and traffic light information; and
    generating estimation vehicle probe information associated with the vehicle based on the context information, wherein the estimation vehicle probe information includes one or more candidate locations of the vehicle.

9. The computer program product of claim 8, wherein the estimation vehicle probe information is based at least in part on the driving information.

10. The computer program product of claim 8, wherein the estimation vehicle probe information is based at least in part on one or more candidate routes.

11. The computer program product of claim 8, wherein the estimation vehicle probe information includes a probability associated with each of the one or more candidate locations.

12. The computer program product of claim 8, wherein the at least one processor further performs operations comprising:
   determining at least one traffic event based on either the reported vehicle probe information or the estimation vehicle probe information; and
   sending the least one traffic event to the vehicle.

13. The computer program product of claim 8, wherein the at least one processor further performs operations comprising:
   determining at least one traffic event based on either the reported vehicle probe information or the estimation vehicle probe information; and
   updating the estimation vehicle probe information.

14. The computer program product of claim 8, wherein the at least one processor further performs operations comprising:
   discarding the estimation vehicle probe information when new reported vehicle probe information is received from the moving vehicle.

15. A system comprising:
   comprising at least one processor and a computer readable storage medium having program instructions embodied therewith, the program instructions executable by the first processor to cause the at least one processor to perform operations comprising:
   determining, at a server, driving information associated with a vehicle that is moving, wherein the driving information includes pattern information associated with past movement of the vehicle;
   periodically receiving reported vehicle probe information from the vehicle, wherein the reported vehicle probe information includes a current location of the vehicle;
   acquiring context information on surroundings of the vehicle if no reported vehicle probe information is received from the vehicle for a predetermined amount of time, wherein the context information comprises one or more of a current traffic speed, traffic congestion information, and traffic light information; and
   generating estimation vehicle probe information associated with the vehicle based on the context information, wherein the estimation vehicle probe information includes one or more candidate locations of the vehicle.

16. The system of claim 15, wherein the estimation vehicle probe information is based at least in part on the driving information.

17. The system of claim 15, wherein the estimation vehicle probe information is based at least in part on one or more candidate routes.

18. The system of claim 15, wherein the estimation vehicle probe information includes a probability associated with each of the one or more candidate locations.

19. The system of claim 15, wherein the at least one processor further performs operations comprising:
   determining at least one traffic event based on either the reported vehicle probe information or the estimation vehicle probe information; and
   sending the least one traffic event to the vehicle.

20. The system of claim 15, wherein the at least one processor further performs operations comprising:
   determining at least one traffic event based on either the reported vehicle probe information or the estimation vehicle probe information; and
   updating the estimation vehicle probe information.

* * * * *